No. 689,430. Patented Dec. 24, 1901.
W. C. SMITH & J. HARRIS.
MACHINE FOR MAKING WIRE FENCING.
(Application filed July 25, 1900.)
(No Model.) 5 Sheets—Sheet 1.

FIG. 1.

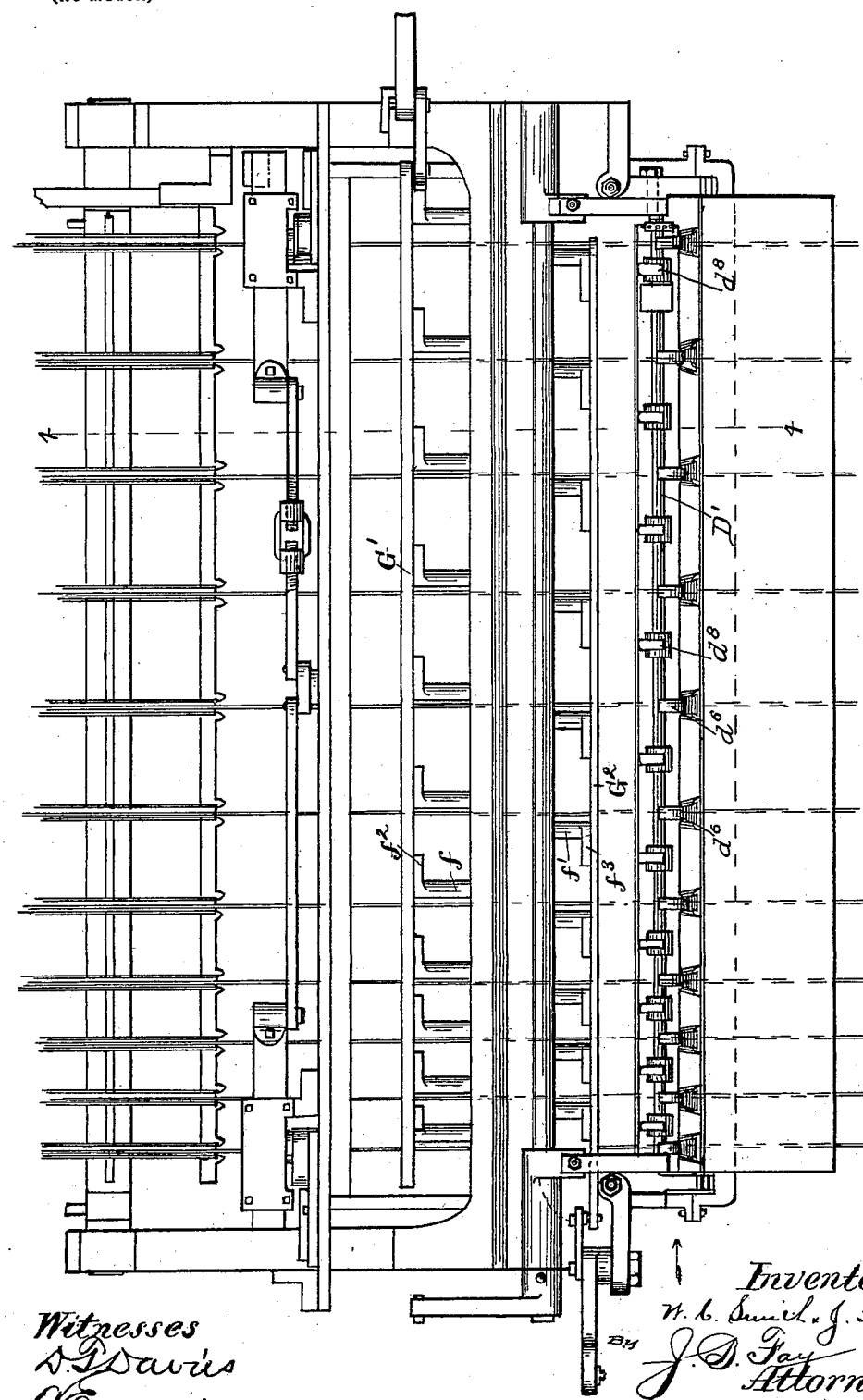

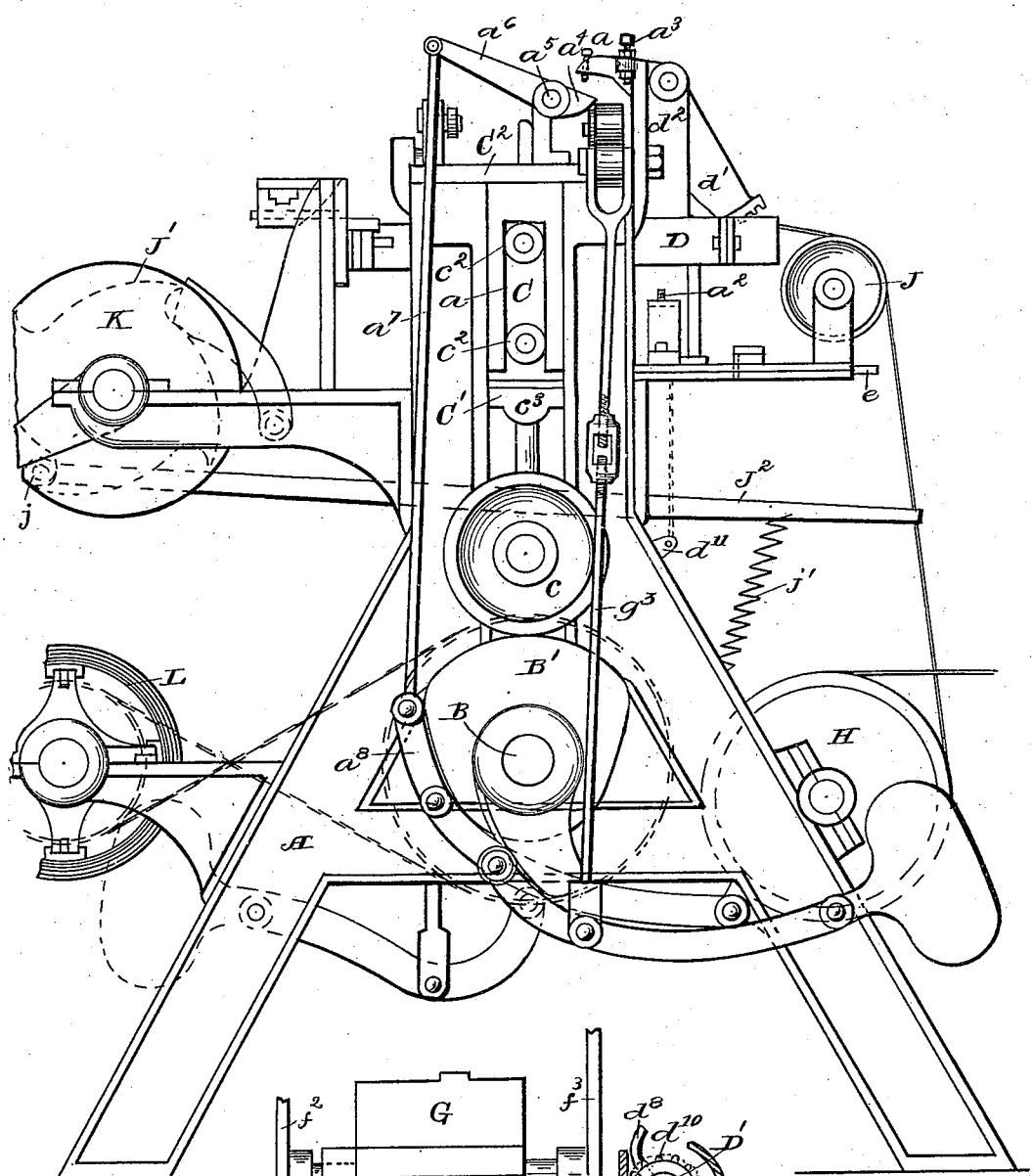

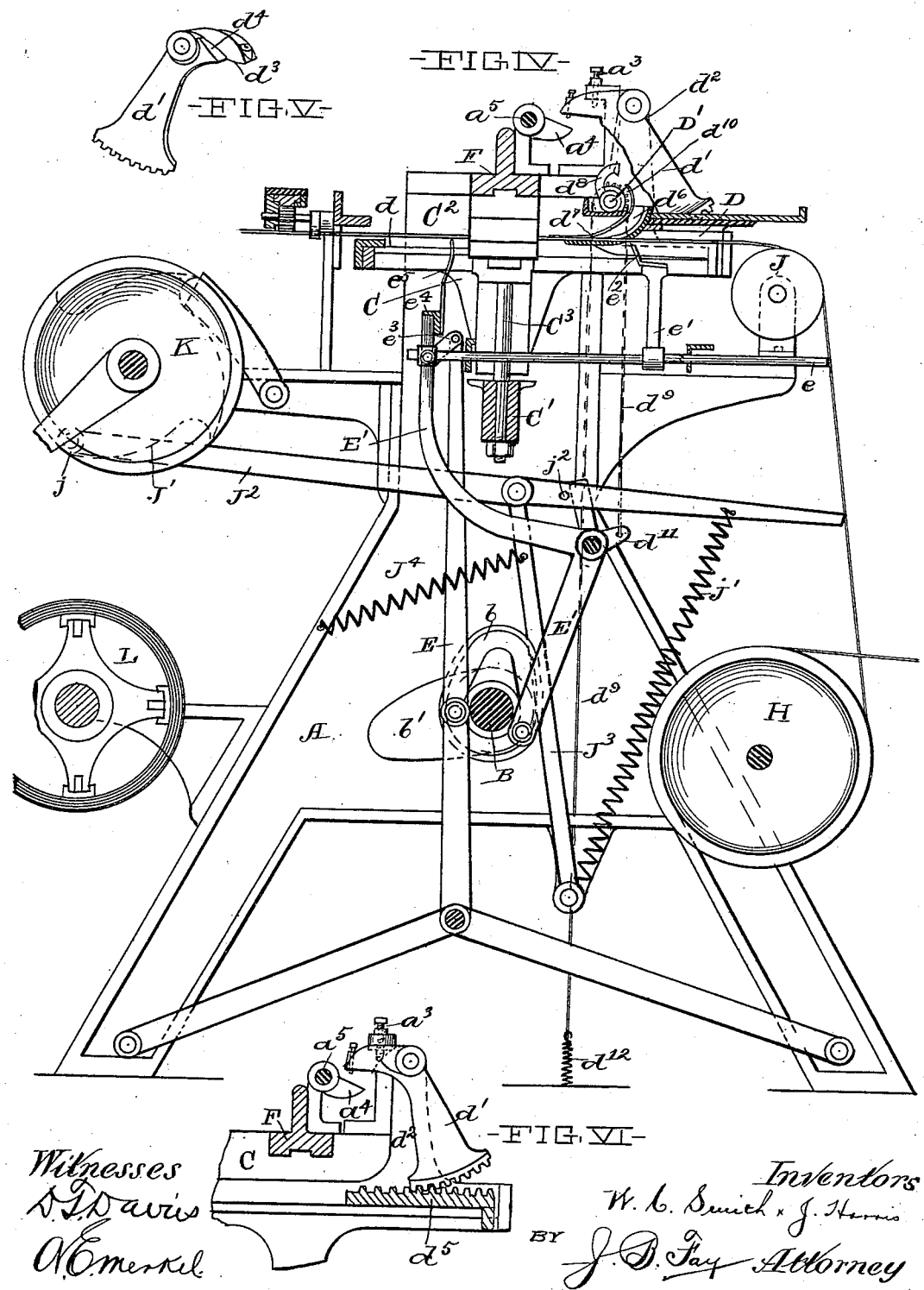

No. 689,430. Patented Dec. 24, 1901.
W. C. SMITH & J. HARRIS.
MACHINE FOR MAKING WIRE FENCING.
(Application filed July 25, 1900.)
(No Model.) 5 Sheets—Sheet 5.
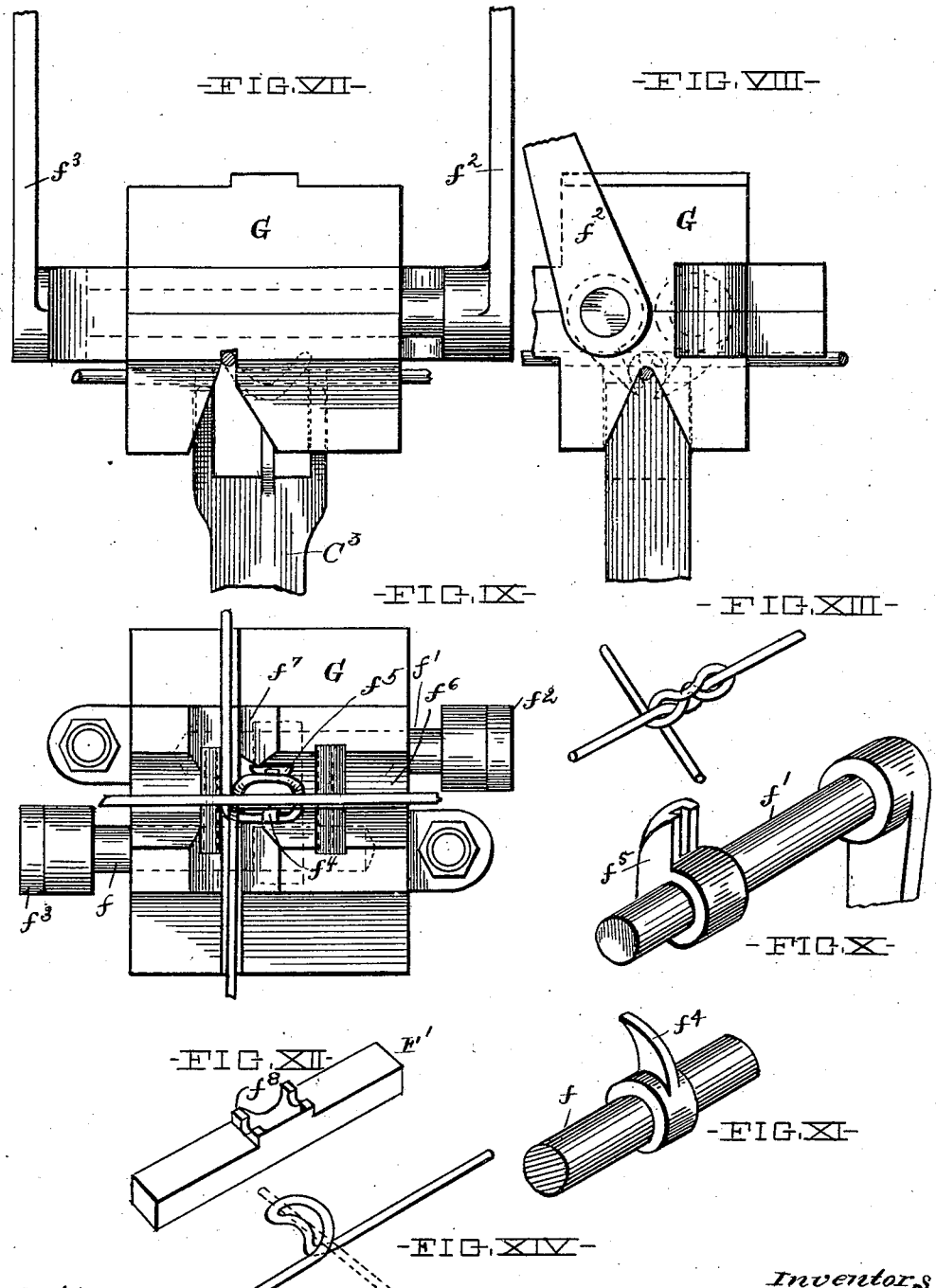

UNITED STATES PATENT OFFICE.

WILLIAM C. SMITH, OF GLENVILLE, AND JONATHAN HARRIS, OF CLEVELAND, OHIO, ASSIGNORS TO SIMEON C. DAVIS, OF CLEVELAND, OHIO.

MACHINE FOR MAKING WIRE FENCING.

SPECIFICATION forming part of Letters Patent No. 689,430, dated December 24, 1901.

Application filed July 25, 1900. Serial No. 24,776. (No model.)

*To all whom it may concern:*

Be it known that we, WILLIAM C. SMITH, a resident of Glenville, and JONATHAN HARRIS, a resident of Cleveland, county of Cuyahoga, State of Ohio, citizens of the United States, have invented a new and useful Improvement in Machines for Making Wire Fences, of which the following is a specification, the principle of the invention being herein explained and the best mode in which we have contemplated applying that principle, so as to distinguish it from other inventions.

Our invention relates to machines for manufacturing wire fences; and it consists of means for feeding looped cross wires or stays upon line-wires and securing same upon the latter, as will be hereinafter fully described.

The annexed drawings and the following description set forth in detail certain mechanism embodying the invention, such disclosed means constituting but one of various forms in which the principle of the invention may be used.

In said annexed drawings, Figure I represents a rear elevation of the device. Fig. II represents a top plan. Fig. III represents a side elevation viewed in the direction indicated by the arrow in Fig. II; Fig. IV, a vertical cross-section taken upon line 4 4, Fig. II, and viewed in the direction indicated by the arrow in said figure; Fig. V, a detail perspective view of a segment for operating the slidable table used in my device; and Fig. VI, a detail cross-sectional view of the upper portion of the machine, showing said table and portion of the machine supporting and operating same. Figs. VII, VIII, and IX represent enlarged detail side and front elevations and a top plan, respectively, of one of the locking-heads forming a part of our invention. Figs. X, XI, and XII are enlarged detail perspective views of the guiding-strips, showing a locking-head in side elevation; and Figs. XIII and XIV are perspective views of the joint formed between the line and cross wires; and Fig. XV represents a detail cross-sectional view of one of the locking-heads, showing adjacent portions of the machine in vertical section.

Upon the lower part of a frame A is journaled longitudinally of the machine an operating-shaft B, Fig. I, suitably driven. At each end of said shaft is secured a cam B', of equal size and similarly located, so as to impart the same movement on each side. Each such cam engages a roller $c$, Fig. III, such two rollers respectively bearing upon journals secured to downwardly-depending arms $c'$, secured to a cross-bar C', forming part of a vertically-reciprocating frame C. Said frame is provided with lateral guiding-rollers $c^2$, which roll in guideways $a$, formed in the frame, as shown in said Fig. III. At intervals along the cross-bar C' are secured a series of upright bars $C^3$, having their upper ends forked, as shown in Fig. VII, the tines of each fork being located at three corners of a rectangle, so as to permit them to contact three points of a joint formed by the cross and line wires. Said cross-bar is provided at each end with a projecting portion $c^3$ and is movable vertically independently of the upper part $C^2$ of the frame C during a portion of the reciprocating movement of said frame.

Such result is accomplished by disconnecting said bar from the main frame portion and providing rests $a^2$ for arresting the downward movement of the frame before the downward stroke of the cross-bar C' is completed. The forks hence continue their downward movement a short distance after the completion of the downward stroke of the main frame portion C' and travel upwardly a short distance before the said frame portion begins its upward movement.

Upon the main frame portion C' are formed horizontal guideways $d$, Fig. IV, upon which is mounted a slidable table D. The reciprocation of this table is effected by means of a segment $d'$, journaled upon a standard $d^2$, secured to said frame A. Said segment is formed with two contact-surfaces $d^3$ and $d^4$, the one $d^3$ being further removed from the segment's pivotal axis than is the other, as shown in Fig. V. A set-screw $a^3$ is secured to a suitable standard secured to the machine-frame and is adapted to engage the surface $d^4$ during the upward movement of the frame, and a dog $a^4$, secured to a rock-shaft $a^5$, journaled in bearings fixed to the machine-frame, is adapted to engage the surface $d^3$ during the downward movement of the frame. Oscillatory movement is imparted to said rock-shaft and dog through the medium of an arm $a^6$ and link $a^7$ and lever $a^8$, engaged by cam B', secured to the operating-shaft B. Such oscillatory movement is imparted to the dog $a^4$, so as to give it an upward stroke during the downward stroke of the frame. Said segment $d'$ engages a rack $d^5$, Fig. VI, secured to said table D, and imparts its motion to the latter. Such motion is hence inward during the downward movement of the frame C and outward during the upward movement of the frame.

At intervals equal in number and distance from each other to the number of and distance between the loops upon the cross-wire which it is desired to secure upon the line-wires are a series of guiding-troughs $d^6$, secured to the table D, each adapted to receive a loop upon the cross-wire. Over each trough extends a guiding-strip $d^7$, whose lower end extends quite closely to its trough, as shown in Fig. XV. Above the series of guiding-strips $d^7$ is journaled in bearings and secured to table D an oscillatory shaft D', which is provided with a series of fingers $d^8$, which are located at points intermediate of the trough $d^6$, as shown in Fig. II. The oscillatory movement of shaft D' is derived from a chain $d^9$, passing over a sprocket $d^{10}$, one end of such chain being secured to the end of a bell-crank $d^{11}$, Fig. IV, and the other to a flexible connection, such as a spring $d^{12}$. Said bell-crank is actuated as will hereinafter be described. Such connection causes the shaft D' to oscillate, so as to actuate the fingers $d^8$ in a downward direction on the forward movement of the table D.

Below the table and transversely of the machine are located two longitudinally-slidable rods $e$, Fig. IV, mounted in suitable bearings secured to the machine-frame. Upon said rods are rigidly secured upright arms $e'$, provided with placing-fingers $e^2$, projecting upwardly beyond the lower portion of the troughs $d^6$. The inner ends of said two rods are each connected with links $e^3$, each of which in turn is connected with a pivoted arm E, oscillated by cam $b$, the oscillation of which arm effects the reciprocation of said rods $e$ and the placing-fingers $e^2$.

Connecting the upper ends of the two bell-cranks E' is a transverse bar $e^4$, upon which are secured upright guiding-fingers $e^5$, which guide the line-wires laterally, such bar being reciprocated by said bell-crank E', actuated by cam $b$.

Across the top of the machine is located a longitudinally-placed supporting-bar F, upon which are secured a series of clamping devices or locking-heads G. (Illustrated in enlarged view in Figs. VII, VIII, IX, X, XI, and XII.) One such head G is located above, back, and has its field of operation in the same vertical transverse planes as are the feeding-troughs $d^6$. Each such head is provided with two downwardly-diverging or V-shaped grooves $f^6 f^7$, placed at right angles with each other, the one groove being in transverse alinement with one of said guiding-grooves. The location of such heads is, further, such that one such head is placed vertically above each of the forked ends of the upright bars $C^3$. Each head is provided with two oscillatory shafts $f$ and $f'$, which derive their oscillating movement from two cross-bars G' and $G^2$, the series of shafts $f$ being connected with bar G' by means of levers $f^2$, with one of which each shaft $f$ is provided, and the series of shafts $f'$ being connected with bar $G^2$ through the medium of a series of levers $f^3$, with one of which each shaft $f'$ is provided. The bars G' and $G^2$ are respectively reciprocated in opposite directions by means of bell-cranks $g$ and $g'$ and rods $g^2$ and $g^3$, actuated by two cams $b^2$, Fig. I. Each shaft is provided with a short arm $f^4$ and $f^5$, respectively, $f^4$ being of male formation and $f^5$ of female, as shown in Figs. X and XI. These arms are placed upon their respective shafts so as to act in a direction upwardly toward each other so as to close and downwardly so as to open. The loops, which are formed upon the stays or cross-wires previously to the time they are fed to this machine, are formed with two curved sides, (illustrated in Fig. XIV,) and the lengths of the two arms are such as to cause the male arm to travel a distance greater than that of the female arm when the loop is located in their respective fields of operation. The one side of said loop is made of greater curvature than is the other, as shown, the method and machine for forming such loop being fully described in our application, Serial No. 22,730, filed July 6, 1900. Such differences of curvature of the loop sides and travel of the two arms cause the one loop side to overlap the other after the formation of the lock, as will further appear. The intersection of the two grooves $f^6$ and $f^7$ forms the field of operation of said two arms $f^4$ and $f^5$, and in said field is placed a die F', whose intaglio is of concave formation flanked by two walls $f^8$, such die being placed in said field so as to project downwardly, with the walls on the two sides of the grooves passing longitudinally of the machine—that is, parallel with the cross-wire, as illustrated in Fig. IX.

Suitably mounted with their axes parallel with the operating-shaft are a series of reels H, J, K, and L, H and L being the line-wire supply reel and the winding-reel for the completed fence, respectively, the two reels J and K being guiding-reels for guiding the line-wire into the machine and the completed fence onto the winding-reel, respectively. The latter reel also feeds the line-wires through the machine. Such feeding operation is effected through the medium of a ratchet-wheel J', secured to the shaft of the reel K, a roller j, secured to the end of an arm J², pivoted upon a pivoted arm J³, the roller being kept in engagement with the ratchet-wheel by a spring j', secured to the opposite end of such arm, as shown in Fig. IV. Said arm J³ is oscillated by means of a cam b', thereby by the aid of a spring J⁴ effecting the intermittent feed of the line-wires by the consequent intermittent rotation of the reel K. In addition to contributing to the feeding operation, arm J² effects the oscillation of bell-crank d¹¹ through the medium of a pin j² which contacts the upper ends of the arm d¹¹ as will be readily understood from Fig. IV.

The cams are timed and connections made so as to cause the device to operate as follows: Assuming the frame C to be in its lowermost position and the operating-shaft to be rotating, the table D is at or near the forward end of its stroke and a feeding operation has just been completed, so as to advance the line-wires, and a cross-wire has just been placed into position upon such line-wires directly beneath the heads G, such placing operation being further described. The next operation which takes place is the elevation of the bars G³, which is followed by the elevation of the main frame portion C². During such elevation of the bars C³ the forked ends of the latter lift the cross-wires and line-wires upwardly into the field of operation of the clamping-heads G. Before reaching the field of operation of the clamping-arms in such heads the segment d' contacts the set-screw a³ and causes the table D, with its attached guides d⁷ and troughs d⁶, to be quickly withdrawn from such field into its forward position, thereby permitting the fence-wires to freely enter the clamping-heads. As soon as the crossed wires have entered the heads the arms f⁴ f⁵ are caused to execute one oscillatory movement, during the first half of which they are caused to approach as a result of the operation of the oscillatory shafts f and f' through the medium of the two cross-bars G' and G². During such approach the said arms engage and bend the two sides of the loop, the one side being, as before stated, caused to overlap the other as a result of the previously-described operation and construction of said two arms, both portions being pressed upon the line-wire. The length of such stroke is caused to be such as to cause the loop to be bent over, as described, prior to the end of such stroke, during the completion of which the line-wire is pressed into the die F' to form a locking-crimp, as shown in Fig. XIII, for preventing longitudinal displacement thereof from the loop. While such last-described operation is taking place a cross-wire is fed into the troughs d⁶, the formed loops being placed in the trough-grooves. The subsequent recession of the frame C is followed by the advance of the table, the oscillating movement of the feeding-fingers d⁸, which carry the cross-wires down over the line-wires, and the advance of the placing-fingers e², which carries the cross-wires under the clamping-heads, the guiding-strips d⁷ holding it down upon the line-wire until the latter part of the upward stroke of the frame C, when the table is quickly withdrawn, as previously described. The forward movement of the table is effected by the contact of the surface d³ with the dog a⁴ during the upward stroke of the frame. The return of the table is accompanied by the return of the placing and feeding fingers. Following each clamping operation a feeding operation is effected for advancing the line-wire through the medium of the ratchet-wheel J' and its connection, previously described.

Other modes of applying the principle of our invention may be employed instead of the one explained, change being made as regards the mechanism herein disclosed, provided the means covered by any one of the following claims be employed.

We therefore particularly point out and distinctly claim as our invention—

1. In a machine for building wire fence from looped vertical wires and longitudinal wires, the combination of a frame adapted to support the working parts, forming-heads depending from a transverse bar upon the frame, and provided with oscillating jaws, means for feeding the longitudinal wires and transversely-placed stay-wires at predetermined intervals underneath said forming-heads, for raising said wires simultaneously to bring the crossings and loops into engagement with the pending jaws, and for operating the jaws.

2. In a machine for the purpose described, the combination with mechanism for feeding longitudinal and transversely-laid vertical wires, the said vertical wires being provided with transversely-projecting loops at predetermined intervals, of forming-heads underneath which said wires pass, said heads being provided with transversely-placed slots adapted to receive the wire-crossings, keepers for forcing the wire-crossings into said slots, oppositely-working jaws mounted in each of said heads adapted to compress the sides of the loops formed upon the vertical wires about the longitudinal wires, and formers upon which the loops are compressed, the said formers being provided with recesses into which the longitudinal wires are crimped, and a keeper for the wires while in the heads.

3. In a machine for the purpose described, the combination with a frame and cross-bar supporting forming-heads of wire-reels at one extremity for the longitudinal wires, guiding-reels adapted to receive the wire therefrom, other guiding-reels upon the same level as the said first-named reels, the said reels being adapted to draw the wire directly underneath the forming-heads whereby the longitudinal and looped vertical wires are passed to the forming-heads, a reel upon which the finished fence is wound, a vibrating fork or finger adapted to feed the transversely-placed vertical wires to the forming-heads and means for compressing the loops in the forming-heads for operating the wire-feeding devices and for retaining the wire-crossings in the heads while the loops are being compressed.

4. In a machine for bending the loops of a fence-stay over the longitudinal wires, a forming-head provided with transverse grooves for the wire-crossings, in combination with jaws mounted therein on oscillating wrists, the said jaws being adapted to move toward and from one another and engage the sides of the loop, and a former provided with a recess into which the longitudinal wire is crimped, and shoulders inclosing the ends of the loop.

5. In a machine for bending the loops of a fence-stay over the longitudinal wires, a forming-head provided with grooves transversely placed at right angles therein to receive the wire-crossings, in combination with oscillating and interlocking jaws adapted to engage the sides of said loops.

6. In a machine for bending the loops of a fence-stay over the longitudinal wires, a forming-head provided with grooves transversely placed therein to receive the wire-crossings, in combination with oscillating jaws adapted to compress the sides of the loops, keepers adapted to retain the wire-crossings in engagement with the jaws, and means for feeding the stay-wires into position to be engaged by the keepers and forced into the transverse grooves adapted to receive them.

7. In a machine for bending the loops of a fence-stay wire over the longitudinal wires, a forming-head provided with grooves transversely placed therein to receive the wire-crossing, in combination with oscillating jaws adapted to compress the sides of the loops, keepers adapted to retain the wire-crossings in engagement with the jaws, means for feeding the stay-wires into position to be engaged by the keepers, and for securely holding them to prevent twisting of the loop thereon until the jaws have acted upon the loops.

8. In a wire-fence machine, the combination with the fixed forming-heads, underneath which the lateral wires pass, and are fed at predetermined intervals; means for feeding looped stay-wires thereto, consisting of fingers secured to an oscillating shaft; upper and lower curved guides for the stay-wires, the lower guides being trough-shaped and in which the stay-wires pass to the forming-heads; and vertical fingers secured to reciprocating bars, adapted to engage the stay-wires when dropped by the oscillating fingers and convey them to the forming-heads.

9. The combination with fixed forming-heads, underneath which the lateral wires pass; of means for feeding looped stay-wires thereto, and for holding them in position, consisting of a horizontally-reciprocating bar, mounted upon a vertically-moving frame; an oscillating shaft upon said bar, upon which are secured curved feed-fingers; upper and lower guides for stay-wires, the lower being trough-shaped for the introduction of said loops; feed-fingers mounted upon a horizontally-reciprocating rod and adapted to engage the stay-wires as the oscillating fingers leave them, and means for operating the several parts.

10. In a wire-fence machine, feeding mechanism for looped stay-wires consisting of the combination with standards of the machine and the forming-heads secured upon a transverse bar between them; of a frame adapted to rise and fall between the standards, a bar mounted upon horizontal guides in the standards and provided with racks at either end; means for reciprocating the bar on the guides, consisting of segmental gears pivoted upon standards upon the said frame; means substantially as described for operating said segments, an oscillating shaft provided with curved fingers; upper and lower guides for the stay-wires; the lower guides being trough-shaped to receive the loops, and fingers vertically placed upon reciprocating bars, and adapted to engage the stay-wires as the curved fingers leave them.

11. In a machine for securing looped stay-wires to lateral wires, the combination with a main frame and stationary forming-heads; of means for feeding the lateral wires underneath said heads at regular intervals; and feeding mechanism for the stay-wires consisting of oscillating fingers adapted to force said wires down upon the lateral wires; upper and lower guides for said stay-wires; the lower guides being trough-shaped to receive said loops; means for reciprocating said guides horizontally and vertically to and from said heads; reciprocating fingers adapted to engage said wires when released by the oscillating fingers and convey them to a central position underneath said heads; vertically-reciprocating keepers adapted to rise and press the wire-crossings into engagement with the said heads; and forks adapted to secure the lateral wires when the forming-levers are at work.

12. In feeding mechanism for the stay-wires of a wire fence; a frame vertically reciprocating in guides in the main standards of the machine; a bar mounted in horizontal guides in said frame; an oscillating shaft provided with curved fingers mounted upon this bar; upper and lower guides, upon said bar, the lower guides being trough-shaped to receive the loops upon said stay-wires; and mechanism for horizontally reciprocating said bar to move forward as the said frame falls and backward as the frame rises.

13. In feeding mechanism for the looped stay-wires of a wire fence, a vertically-reciprocating frame; a horizontally-reciprocating bar mounted in said frame, and provided with oscillating feed-fingers and upper and lower guides for the stay-wires; in combination with the mechanism for reciprocating said bar, consisting of racks at either extremity thereof; gear-segments engaging said racks, and pivoted gear-lugs secured upon said frame; and projections from said segments adapted to engage solid projections upon the main bed-plate of the machine as the said frame rises, and arms upon an oscillating rod as the frame falls, whereby the said bar and guides are thrown backward as the frame rises and forward as the frame falls.

Signed by me this 23d day of July, 1900.

WILLIAM C. SMITH.

Attest:
D. T. DAVIES,
A. E. MERKEL.

Signed by me this 16th day of July, 1900.

JONATHAN $\overset{\text{his}}{\times}$ HARRIS.
mark

Attest:
HENRI G. IDE,
E. S. MARSH.